M. CLARK.
VEHICLE WHEEL AND TIRE.
APPLICATION FILED OCT. 11, 1909.

993,028.

Patented May 23, 1911.

Witnesses:
P. J. Gathmann.
M. G. Ady.

Inventor
Melville Clark
By his Attorneys:
Burton & Burton

UNITED STATES PATENT OFFICE.

MELVILLE CLARK, OF CHICAGO, ILLINOIS.

VEHICLE WHEEL AND TIRE.

993,028.

Specification of Letters Patent. Patented May 23, 1911.

Application filed October 11, 1909. Serial No. 522,090.

*To all whom it may concern:*

Be it known that I, MELVILLE CLARK, a citizen of the United States, residing at Chicago, in the county of Cook and State of Illinois, have invented new and useful Improvements in Vehicle Wheels and Tires, of which the following is a specification, reference being had to the drawings forming a part thereof.

The purpose of this invention is to provide an improved construction of a vehicle wheel having a cushioned or pneumatic or otherwise yielding tire, and is designed to provide means for retaining the cushioning tread element of the tire in the element with respect to which it is movable and is adapted to reduce the friction between the two parts in such movement.

It consists in the features of construction shown and described as indicated in the claims.

Figure 1:
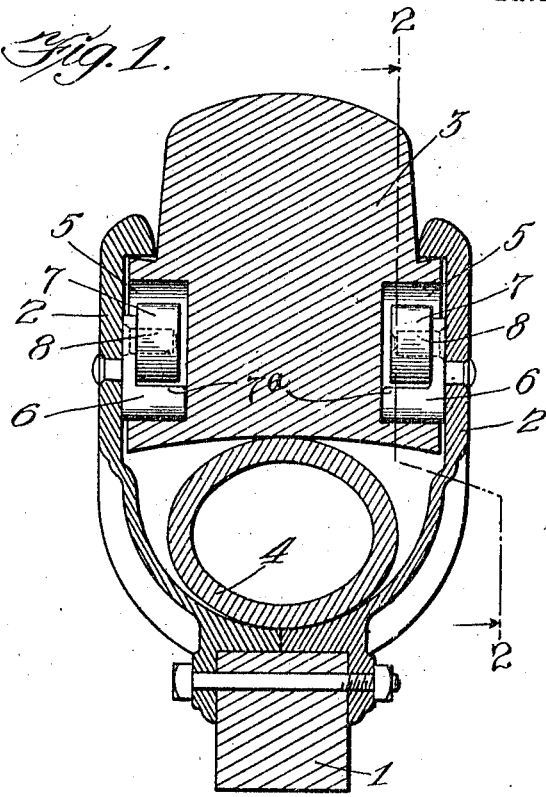
Figure 2:
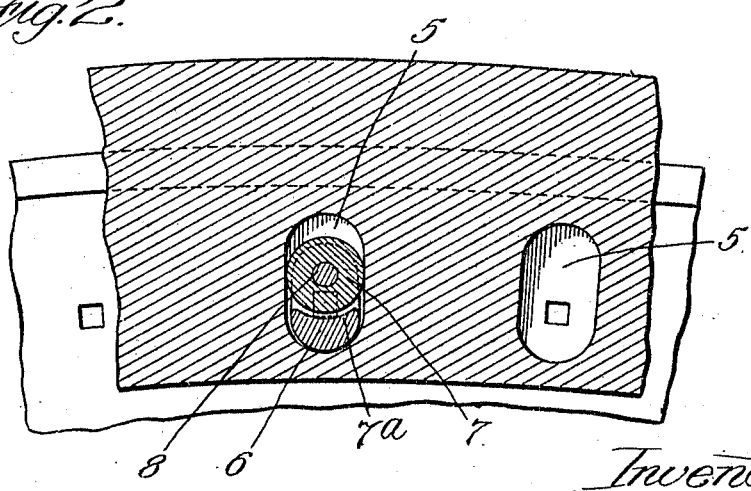

In the drawings: Figure 1 is a section radial with respect to the wheel transverse with respect to the tire and the felly of a wheel embodying this invention. Fig. 2 is a section at the line 2—2 on Fig. 1.

In the drawings, 1, represents the ordinary wood felly of a wheel, having bound against its opposite sides annular flange-like tire members 2, 2, between which there is engaged and retained a cushioning tread member 3, which may encompass and retain between the annular flange members 2, an inflatable pneumatic member 4, though the presence of this pneumatic member is not material to the invention. For engaging the cushioning tread member 3, with the annular flange members 2, said tread member 3, has radial pockets 5, elongated in a direction radial with respect to the wheel, into which pockets abutments 6, project from the annular flange members 2, preventing the creeping of the tread member around the wheel. The abutments as a whole, that is including the roller 7, hereinafter more particularly mentioned, are oblong with their greater length radial with respect to the wheel but shorter in that direction than the pockets so as to allow proper range of movement of the tread member 3, radially with respect to the wheel, as is necessary for yielding under the weight of the load for cushioning. This movement in a rapidly traveling vehicle is liable to occasion a severe friction between the sides of the pockets and the abutments, tending to wear away the material of the tread member 3, and also to heat it sometimes to an injurious degree.

To reduce the friction and prevent heating, each of the abutments 6 comprises an antifriction roller 7, whose axis is parallel to the axis of the wheel and whose diameter is a little greater than the width of the remainder of the abutment measured circumferentially with respect to the wheel, so that the roller projects beyond the surface of the abutment and makes the contact of the abutment with the wall of the pocket. Obviously the entire abutment might consist of the roll and the stud 8 upon which it is mounted, but there is considered to be some advantage in making the abutment, as a whole, oblong by providing what may be called the guarding portion 7ª, at the inner side of the antifrictional rolls, that is at the side toward the center of the wheel, so that in case of any extreme tendency of the tread member to creep, the area of the guard portion of the roller will be embedded or impressed into the wall of the pocket only to the depth of its protrusion beyond the surface of said guard portion, and the area of said surface will be added to that of the embedded portion of the roll for compression of the substance of the tread member in resisting the creeping tendency.

I claim:—

1. In a vehicle wheel, in combination with the felly, annular guard rims or flanges bound against the opposite sides of the felly, and a cushioning tread member interposed between the guard rims; the tread member having lateral pockets elongated radially with respect to the wheel, the guard rims having oblong abutments protruding into the pockets shorter than the length of the pockets, such abutments comprising each a rigid stud and an anti-friction roll mounted for rotation parallel to the axis of the wheel and of a diameter slightly greater than the width of the stud.

2. In a vehicle wheel, in combination with the felly, annular guard rims or flanges bound against the opposite sides of the felly and a tread member interposed between the guard rims; the tread member having lateral pockets elongated radially with respect to the wheel, the guard rims having oblong abutments protruding into the pockets shorter than the length of the pockets, such abutments comprising each a rigid stud and an antifriction roll mounted for rotation about an axis substantially parallel with the plane of the wheel having its circumferential periphery protruding beyond the stud.

In testimony whereof, I have hereunto set my hand at Chicago, Illinois, this 7th day of October, 1909.

MELVILLE CLARK.

Witnesses:
C. J. CHRISTOFFEL,
M. G. ADY.

Copies of this patent may be obtained for five cents each, by addressing the "Commissioner of Patents, Washington, D. C."